United States Patent
Roesser et al.

(10) Patent No.: US 9,304,005 B2
(45) Date of Patent: Apr. 5, 2016

(54) APPLICATION PROGRAMMING INTERFACE (API) FOR NAVIGATION APPLICATIONS THAT MERGES INCREMENTAL UPDATES WITH EXISTING MAP DATABASE

(75) Inventors: Robert P. Roesser, Southfield, MI (US); Sarmad Y. Hermiz, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1502 days.

(21) Appl. No.: 12/631,708

(22) Filed: Dec. 4, 2009

(65) Prior Publication Data

US 2011/0137546 A1    Jun. 9, 2011

(51) Int. Cl.
*G01C 22/00* (2006.01)
*G01C 21/32* (2006.01)

(52) U.S. Cl.
CPC ....................................... *G01C 21/32* (2013.01)

(58) Field of Classification Search
None
See application file for complete search history.

(56) References Cited

U.S. PATENT DOCUMENTS

| 8,249,801 B2 | 8/2012 | Sakai et al. | |
| 2006/0195256 A1 | 8/2006 | Nakamura | |
| 2008/0005734 A1* | 1/2008 | Poristoin et al. | 717/168 |
| 2008/0262714 A1* | 10/2008 | Abramovich Ettinger | 701/201 |
| 2009/0222200 A1* | 9/2009 | Link et al. | 701/202 |
| 2010/0017108 A1* | 1/2010 | Nakamura et al. | 701/200 |
| 2010/0217837 A1* | 8/2010 | Ansari et al. | 709/218 |

FOREIGN PATENT DOCUMENTS

| JP | 2008-185416 A | 8/2008 |
| KR | 10-0826553 B1 | 4/2008 |
| KR | 10-2009-0062161 A | 6/2009 |

* cited by examiner

*Primary Examiner* — Adam Alharbi
(74) *Attorney, Agent, or Firm* — John A. Miller; Miller IP Group, PLC

(57) ABSTRACT

A system and method for efficiently updating the map database in a mobile computing system, such as a vehicle navigation system. The system includes a central server that computes changes between the latest version of a master map database and a previous version of the map database, and wirelessly transmits the changes to participating vehicles' onboard navigation systems. The navigation system stores the changes in a look-aside buffer, and a navigation processor uses the stored changes to update a base map database.

7 Claims, 1 Drawing Sheet

APPLICATION PROGRAMMING INTERFACE (API) FOR NAVIGATION APPLICATIONS THAT MERGES INCREMENTAL UPDATES WITH EXISTING MAP DATABASE

BACKGROUND OF THE INVENTION

1. Field of the Invention

This invention relates generally to a system and method for updating map databases used in mobile computer-based applications and, more particularly, to a system and method for incrementally updating a map database used in a vehicle navigation system that includes computation of the changes between the latest version of a master map database and a previous version of the map database, transmission of those changes to participating vehicles' onboard navigation systems, and using those changes with a base onboard map database for navigation purposes.

2. Discussion of the Related Art

Many modern mobile computing applications rely on an accurate road map database to perform their functions. One of the most common such applications is an onboard vehicle navigation system, but there are others, such as active vehicle safety systems and driver assistance systems. These mobile computing applications are delivered to the consumer preloaded with a current map database. However, changes to the map data are inevitable as roads are added or changed, intersections are added or modified, temporary road closures and detours are implemented, data errors are discovered and corrected, new points of interest arise, and so forth. The need exists for an efficient way of updating the mobile map databases to reflect these changes; without such updates, the mobile map databases will become increasingly inaccurate over time, as changes to the road system accumulate.

Updating the map database in many thousands or millions of mobile computing systems is typically problematic. One method of doing so is to automatically download a complete new database to the mobile computing systems periodically. This approach is prohibitively slow, because the bandwidth for wireless transmission is low and the size of the databases is large. An alternative is to send out a physical computer disk (CD or DVD) to the owners of all applicable mobile computing systems and ask the owners to install the new database. This approach is costly and unreliable.

Another alternative is to automatically download just the incremental changes of the map database to the participating mobile computing systems periodically. This approach has the advantages of being automatic and minimizing wireless bandwidth consumption. But until now, the efficient real-time usage of the change data in conjunction with the base map data has not been possible. The identification reference numbers of road segments and intersections often change from one version of a master map database to the next version, so it is not possible to simply merge the changes with the baseline map data in the mobile device. Another reason a simple merge is not possible is because the map databases are heavily indexed—by geography, connectivity, and so forth—to improve search performance, so if new data were inserted the entire database would have to be re-indexed. Further, such re-indexing is not practical in typical mobile computing devices, such as vehicle navigation systems, because those systems do not have the computational power necessary for the task. In order to make possible the use of incremental map change data in mobile computing devices, a new methodology of storing the changes and re-integrating them in real time with the base map data is needed.

SUMMARY OF THE INVENTION

In accordance with the teachings of the present invention, a system and method are disclosed for efficiently updating the map database in a mobile computing system, such as a vehicle navigation system. The system includes a central server that computes changes between the latest version of a master map database and a previous version of the map database, and wirelessly transmits the changes to participating vehicles' onboard navigation systems. The navigation system stores the changes in a look-aside buffer, and a navigation processor uses the stored changes to update a base map database.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for incrementally updating map databases used in mobile computer-based applications is merely exemplary in nature, and is in no way intended to limit the invention or its applications or uses. For example, the present invention has particular application for a vehicle navigation system. However, as will be appreciated by those skilled in the art, the system and method of the invention may be used for other applications including other navigation system applications or non-navigation system applications.

The present invention proposes a system and method for incrementally updating map databases used in mobile computer-based applications, and efficiently using this updated data in real time for the mobile device's intended application, for example, a vehicle navigation system. In order to efficiently use incremental map changes in a vehicle navigation system, it is first necessary to accurately and succinctly determine exactly what changes have occurred in the master map data. Map databases are provided by companies which specialize in maintaining and publishing such data, but these companies do not currently provide their customers with data in the form of map changes only. Rather, the companies simply provide their customers with a full new version of the map database periodically. Thus, it is left to the customer (the maker of the mobile computing system, or more specifically, the vehicle navigation system) to parse out exactly what has changed between one version of a map database and the next version.

Figure 1:
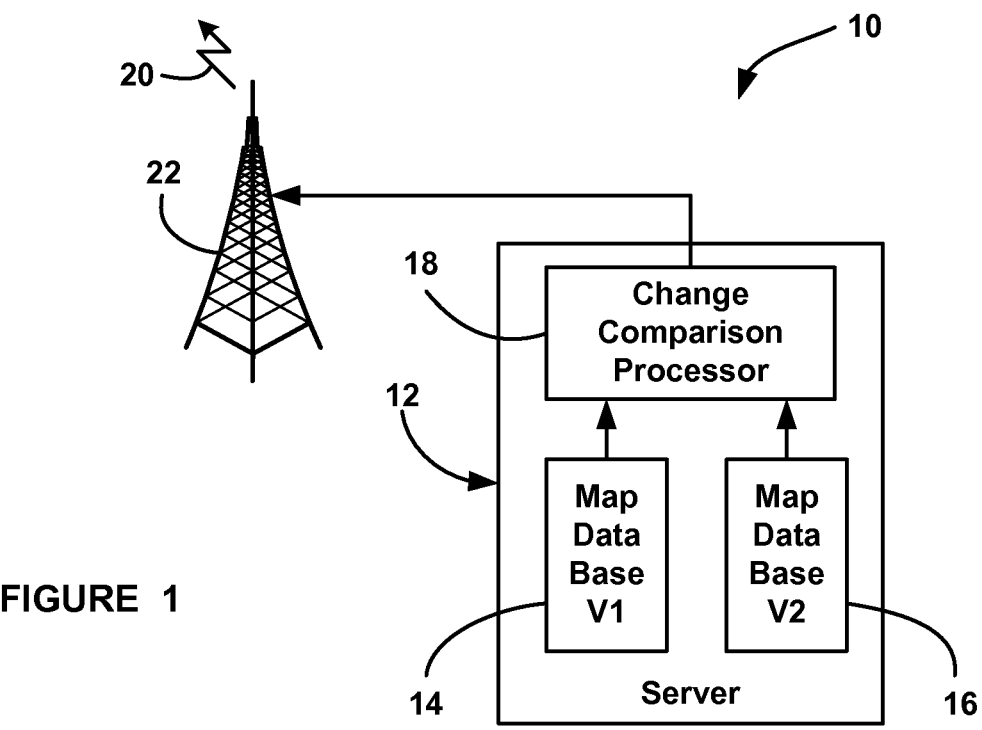
FIG. 1 is a schematic illustration of a central server-based system which computes changes between the latest version of a master map database and a previous version of the map database, and wirelessly transmits those changes to participating mobile computing systems.

FIG. 1 is an illustration of a system 10 that broadcasts changes between different versions of a map database to be received and implemented in various vehicle navigation systems, as will be discussed in detail below. The system 10 includes a computer server 12 that stores a plurality of map databases, where each map database represents a different version of an original map database that has been updated over time. For the illustration shown in FIG. 1, the server 12 includes a first map database 14 for a version V1 and a second map database 16 for a version V2, where the version V2 is a later version than the version V1 of the map database. Particularly, the version V2 will include various additions, deletions, changes, etc. from the version V1 that is provided by the company that generates the map database to be used in the vehicle navigation systems. As will be appreciated by those skilled in the art, the server 12 would typically include many versions of the map database as the master map publishing company periodically prepared and distributed them over time.

The map databases 14 and 16 are sent to a change comparison processor 18 in the server 12 that determines the differences between the two versions of the map databases 14 and 16. The processor 18 uses any suitable algorithm that is able to identify index changes, reference number changes, etc. in the map databases 14 and 16 and is able to isolate those changes. The processor 18 is able to identify changes between any two versions of the map database, and not just necessarily two consecutive versions of the map database. The processor 18 generates transaction files 20 identifying the changes between the various versions of the map databases stored on the server 12. Each transaction file 20 generated by the processor 18 will have an identification number associated with it so that the specific changes between any two versions can be identified by the vehicles.

The transaction files 20 are sent to a distribution tower 22 that wirelessly broadcasts the various transaction files 20 to be received by the many vehicles who can then update their map database on-board. The particular vehicle will know which version of the map database it has and from that will be able to tell which transaction file 20 it should receive and process so that it can download the proper transaction file for its version of the map database.

Once the map database changes have been parsed out and transmitted, the mobile computing devices need to be able to receive the map change data, store it, and use it for navigation.

Figure 2:
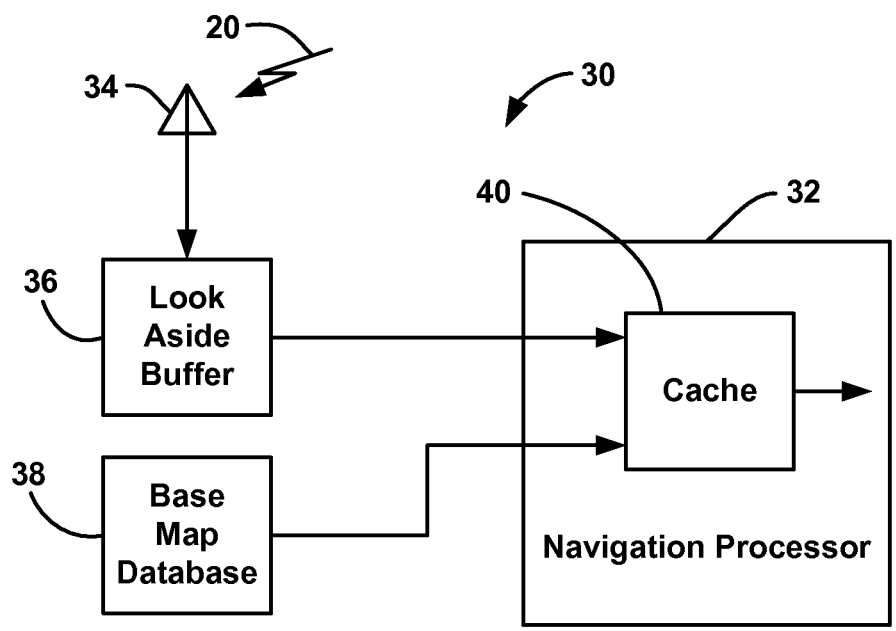
FIG. 2 is a schematic illustration of a mobile navigation system, which receives the wirelessly transmitted map change data from the server-based system shown in FIG. 1, stores the change data in a "look-aside" buffer separate from a base onboard map database, and merges the base map data with the incremental change data in a memory cache as needed by the navigation system processor.

FIG. 2 is an illustration of such a mobile computing device, represented as a navigation system 30, including a navigation processor 32, an antenna 34, and other elements. The navigation system 30 receives via the antenna 34 the transaction files 20 which were transmitted as described in the discussion above. The system 30 stores the records contained in these transaction files in a look-aside buffer 36, or merges these records with what is already contained in the look-aside buffer 36. The look-aside buffer 36 is a separate data store from an onboard base map database 38. During real-time execution of the navigation system's program, all map data is accessed through a memory cache 40, which maintains in its memory the map data in the vicinity of the vehicle's current location. The memory cache content is maintained by an Application Programming Interface, or API, which is a set of routines that first transfers map data from the base map database 38, and supplements it as appropriate with incremental changes from the look-aside buffer 36. This works as follows. The memory cache 40 calls into memory from the base map database 38 all of the map elements, such as road segments and intersections, that are within a prescribed range of the vehicle's current location, where each of these map elements has a reference number associated with it. The API then searches the look-aside buffer 36 for change records associated with any of the map elements which are currently in the memory cache 40.

The navigation processor 32 is programmed to efficiently re-construct the latest configuration of the map data from the base map data and the incremental change data that reside in the memory cache 40, in a manner that is the inverse of that described previously for FIG. 1. For example, if the memory cache 40 currently contains data from the base map database 38 for an item named Road Segment #567 indicating that this is a two-lane road, and there is a change record from the look-aside buffer 36 which indicates that Road Segment #567 has been changed from a two-lane road to a four-lane road, the navigation processor 32 will understand that it should represent Road Segment #567 as a four-lane road. Similar logic can be used to account for any other changes, additions, or deletions that may occur as road map databases are updated over time.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for updating a map database, said method comprising:
    providing a computing system programmed for:
    determining changes between a latest version of the map database and a previous version of the map database;
    formatting the changes into transaction files, wherein determining changes between a latest version of the map database and a previous version of the map database and formatting the changes into transaction files occur on a central server system, and wherein the changes between the latest version of the map database and the previous version of the map database include changes to identification reference numbers of map elements and changes to database indexing;
    transmitting the transaction files;
    storing the transmitted transaction files in a look-aside buffer;
    providing a base map database and the transaction files from the look-aside buffer to a dynamic memory cache; and
    updating the base map database in the dynamic memory cache using the transaction files, wherein storing the transaction files, providing the base map database and the transaction files to the dynamic memory cache, and updating the base map database using the transaction files occur at a location remote from the central server system, and wherein updating the base map database in the dynamic memory cache is done by reading into the dynamic memory cache all map elements from the base map database in the vicinity of the navigation system, searching the look-aside buffer for any transaction file records which apply to map elements currently in the dynamic memory cache, and using the transaction file records to modify the map elements of the base map database.

2. The method according to claim 1 wherein the location remote from the server system is a navigation system.

3. The method according to claim 2 wherein the navigation system is an onboard vehicle navigation system.

4. The method according to claim 1 wherein transmitting the transaction files is done wirelessly.

5. A system for updating a map database, said system comprising:
- a computing system that includes:
  - a computer server storing a plurality of different versions of an original map database, said server including a change comparison processor programmed for comparing the different versions of the original map database stored in the server and generating a plurality of transaction files identifying differences between the stored versions of the original map database, wherein the differences between a latest version of the map database and a previous version of the map database include changes to identification reference numbers of map elements and changes to database indexing, said server causing the transaction files to be broadcast;
  - a base map database stored at a location remote from the computer server, said base map database being one of the versions of the original map database that is stored on the server;
  - a look-aside buffer receiving one or more of the transaction files from the computer server at the remote location; and
  - a memory cache provided at the remote location, said cache receiving the transaction files from the look-aside buffer and the base map database and using the transaction files to update the base map database, wherein the look-aside buffer, the base map database and the memory cache are part of a vehicle navigation system on-board a vehicle, and wherein the cache is part of a vehicle navigation processor, and wherein the vehicle navigation processor is programmed to updates the base map database in the memory cache by reading into the memory cache all map elements from the base map database in the vicinity of the navigation system, searching the look-aside buffer for any transaction file records which apply to map elements currently in the memory cache, and using the transaction file records to modify the map elements of the base map database elements.

6. The system according to claim 5 wherein the transaction files are wirelessly transmitted.

7. An updating system for updating a map database on a vehicle navigation system, said updating system comprising:
- a computer server storing a plurality of different versions of an original map database, said server including a change comparison processor programmed for comparing the different versions of the original map database stored in the server and generating a plurality of transaction files identifying differences between the stored versions of the original map database wherein the differences between a latest version of the map database and a previous version of the map database include changes to identification reference numbers of map elements and changes to database indexing, said server causing the transaction files to be wirelessly transmitted;
- a base map database stored in the navigation system, said base map database being one of the versions of the original map database that is stored on the server;
- a look-aside buffer provided in the navigation system, said look-aside buffer receiving one or more of the transaction files from the computer server; and
- a navigation processor programmed for receiving the transaction files from the look-aside buffer and the base map database and using the transaction files to update the base map database, wherein the vehicle navigation processor updates the base map database in a dynamic memory cache by reading into the dynamic memory cache all map elements from the base map database in the vicinity of the navigation system, searching the look-aside buffer for any transaction file records which apply to map elements currently in the dynamic memory cache, and using the transaction file records to modify the map elements from the base map database.

* * * * *